(12) United States Patent
Sato

(10) Patent No.: US 7,926,845 B2
(45) Date of Patent: Apr. 19, 2011

(54) INSTRUMENT PANEL FOR VEHICLE AND METHOD FOR ATTACHING VEHICLE-MOUNTED DEVICE TO INSTRUMENT PANEL FOR VEHICLE

(75) Inventor: Tadashi Sato, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 51 days.

(21) Appl. No.: 12/387,519

(22) Filed: May 4, 2009

(65) Prior Publication Data

US 2009/0284038 A1 Nov. 19, 2009

(30) Foreign Application Priority Data

May 14, 2008 (JP) ................................. 2008-127726

(51) Int. Cl.
*B62D 1/16* (2006.01)
(52) U.S. Cl. ........................................ 280/779

(58) Field of Classification Search .................. 280/779; 180/90; 296/70, 72
See application file for complete search history.

(56) References Cited

FOREIGN PATENT DOCUMENTS

| JP | 2000-025652 | 1/2000 |
| JP | 2005-132251 | 5/2005 |
| JP | 2005-297733 | 10/2005 |
| JP | 2008-290508 | 12/2008 |

*Primary Examiner* — Faye M. Fleming
(74) *Attorney, Agent, or Firm* — Carrier Blackman & Associates, P.C.; Joseph P. Carrier; William D. Blackman

(57) ABSTRACT

An instrument panel for a vehicle, includes: a steering device; a steering hanger beam supporting the steering device; a bracket including a base fixed to the steering hanger beam, an extending portion that extends to a front of the vehicle from the base, a support section that is curved toward an upper portion of the vehicle at a front portion of the extending portion and extends substantially toward a rear of the vehicle; and a vehicle-mounted device supported by the support section and fixed to the steering hanger beam via the bracket.

12 Claims, 8 Drawing Sheets

INSTRUMENT PANEL FOR VEHICLE AND METHOD FOR ATTACHING VEHICLE-MOUNTED DEVICE TO INSTRUMENT PANEL FOR VEHICLE

BACKGROUND OF THE INVENTION

1. Field of the Invention

The present invention relates to an instrument panel for a vehicle and a method for attaching a vehicle-mounted device to an instrument panel for a vehicle.

This application claims priority from Japanese Patent Application No. 2008-127726, filed on May 14, 2008, the contents of which are incorporated herein by reference.

2. Description of Related Art

Conventionally, as disclosed in, for example, Japanese Unexamined Patent Application, First Publication No. 2005-297733, an instrument panel for a vehicle in which a vehicle-mounted device, such as an audio unit, is supported by a steering hanger beam via brackets attached to right and left sides of the vehicle is known.

However, in the above-described instrument panel for a vehicle, since the audio unit which is a standard item is large and heavy, there is a problem in that the degree of layout freedom of the vehicle-mounted device and the periphery of the vehicle-mounted device is limited.

SUMMARY OF THE INVENTION

The invention was made in view of the above-described situation, and provides an instrument panel for a vehicle and a method for attaching a vehicle-mounted device to an instrument panel for a vehicle, in which it is possible to improve the degree of layout freedom of the vehicle-mounted device and the periphery of the vehicle-mounted device.

A first aspect of the invention provides an instrument panel for a vehicle, including: a steering device; a steering hanger beam supporting the steering device; a bracket including a base fixed to the steering hanger beam, an extending portion that extends to a front of the vehicle from the base, a support section that is curved toward an upper portion of the vehicle at a front portion of the extending portion and extends substantially toward a rear of the vehicle; and a vehicle-mounted device supported by the support section and fixed to the steering hanger beam via the bracket.

It is preferable that the instrument panel of the first aspect of the invention further include a storage section provided below the support section.

It is preferable that the instrument panel of the first aspect of the invention further include an instrument panel body having an opening section. In the instrument panel, the instrument panel body is fixed to the steering hanger beam below the support section, and the storage section is removably provided in the opening section of the instrument panel body.

It is preferable that the instrument panel of the first aspect of the invention further include: an instrument panel body; and a frame. In the instrument panel, the support section is supported by the instrument panel body via the frame.

A second aspect of the invention provides a method for attaching vehicle-mounted device to an instrument panel for a vehicle. The method includes: providing the instrument panel including: a steering device; a steering hanger beam supporting the steering device; a bracket including a base fixed to the steering hanger beam, an extending portion that extends to a front of the vehicle from the base, a support section that is curved toward an upper portion of the vehicle at a front of the extending portion in the vehicle, extends substantially toward a rear of the vehicle, and supports the vehicle-mounted device; an instrument panel body including a first opening section; and a second opening section. Furthermore, the method includes: attaching the bracket to the vehicle-mounted device so that the bracket is integrated with the vehicle-mounted device; inserting a unit in which the bracket has been integrated with the vehicle-mounted device to the second opening section; fixing the base of the bracket to the steering hanger beam through the first opening section formed on the instrument panel body; and blocking the first opening section of the instrument panel body.

It is preferable that the method of the second aspect of the invention further include fixing the support section by a frame, and covering the support section and the second opening section with the frame.

According to the instrument panel for the vehicle of the first aspect of the invention, since the bracket includes the extending portion which extends to the front of the vehicle, the vehicle-mounted device can be arranged at the front of the vehicle with respect to the steering hanger beam compared with a conventional vehicle-mounted device. Therefore, the degree of layout freedom of parts in front of and above the steering hanger beam can be improved while the vehicle-mounted device is firmly supported.

In addition to the above effects, in the instrument panel for the vehicle of the first aspect of the invention, there is an effect that the space below the support section can be effectively used as a storage space by providing the storage section below the support section.

In addition to the above effects, in the instrument panel for the vehicle of the first aspect of the invention, when the vehicle-mounted device is attached to the steering hanger beam via the bracket, the base of the bracket can be accessed via the opening of the instrument panel body to which the storage section is attached. Therefore, attachment workability of the vehicle-mounted device can be improved.

In addition to the above effects, in the instrument panel for the vehicle of the first aspect of the invention, the support section is supported by the instrument panel body via the frame and the load of the vehicle-mounted device is decentralized in the instrument panel body. Thus, even when the distance from the steering hanger beam to the vehicle-mounted device increases, there is an effect that vibration of the vehicle-mounted device can be prevented.

According to the method for attaching a vehicle-mounted device to the instrument panel for the vehicle of the second aspect of the invention, the first opening section is blocked after the bracket is attached to and integrated with the vehicle-mounted device, this integrated unit is inserted through the second opening section (i.e., opening used for attaching a vehicle-mounted device), and the base of the bracket is fixed to the steering hanger beam through the first opening section. Therefore, there is an effect that the vehicle-mounted device can be firmly fixed to the steering hanger beam, and attachment operation of the vehicle-mounted device can be easily performed.

In addition to the above effects, in the method for attaching a vehicle-mounted device to the instrument panel for the vehicle of the second aspect of the invention, the support section and the second opening section are covered and fixed by the frame. The support section is thereby supported by the instrument panel body via the frame and the load of the vehicle-mounted device is decentralized in the instrument panel body. Thus, even in a case where the distance from the steering hanger beam to the vehicle-mounted device increases, there is an effect that vibration of the vehicle-mounted device can be easily prevented.

DETAILED DESCRIPTION OF THE INVENTION

Next, an instrument panel for a vehicle in the embodiment of this invention will be described with reference to the drawings.

In addition, a vehicle with a right steering wheel in which a driver's seat is arranged on the right with respect to a traveling direction and a passenger seat is arranged on the left with respect to the traveling direction will be described as an example.

Additionally, "the front", "the rear", "the right", and "the left" in the following description are respectively the front, the rear, the right, and the left of the vehicle.

Figure 1:
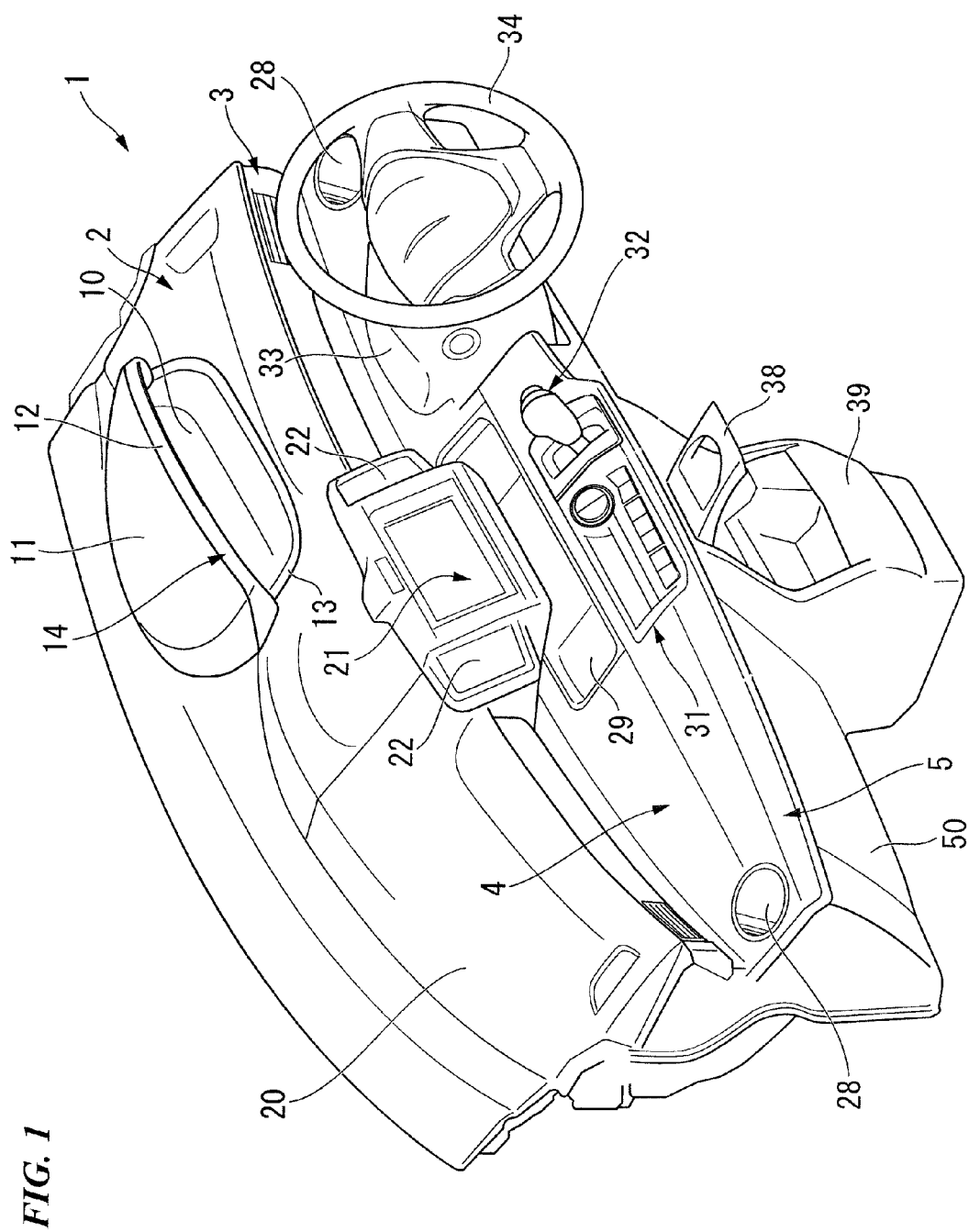
FIG. 1 is a perspective view showing an instrument panel in an embodiment of the invention.

FIG. 1 shows an instrument panel 1 and its associated parts arranged in the interior of the vehicle. The instrument panel 1 has an upper face portion 2 (upper face), a vertical face portion 3 which extends downward from a trailing edge of the upper face portion 2, a stepped upper face portion 4 which extends rearward from a lower edge of the vertical face portion 3, and a front portion 5 which inclines downward toward the front from the trailing edge of the stepped upper face portion 4 and extends downward. The vertical face portion 3 and the stepped upper face portion 4 constitute an instrument panel body.

On the right of the upper face portion 2 of the instrument panel 1, a meter 10 which displays a vehicle speed and the like toward a driver, a visor 11 which is arranged so as to cover the upper side of the meter 10, and a visor cover 14 composed of an upper cover 12 and a lower cover 13 which are arranged so as to cover the periphery of the meter 10.

Additionally, an air bag lid 20 made of resin (resin part), which comes off from the instrument panel 1 when an air bag for a passenger seat is deployed, is arranged on the left of the upper face portion 2 of the instrument panel 1.

An AV unit 21 (vehicle-mounted device) is provided in an intermediate portion in a direction extending from the right side to the left side of the vertical face portion 3 of the instrument panel 1. Air-conditioner blow-off ports 22 are respectively provided on both sides of the AV unit 21.

Drink holders 28 are respectively provided at both ends in a direction extending from the right side to the left side of the stepped upper face portion 4 of the instrument panel 1. A storage tray 29 (storage section) is provided at a front position of the intermediate portion in the direction extending from the right side to the left side of the stepped upper face portion 4.

Additionally, an air-conditioner operation unit 31 on the left and a shift lever 32 on the right are arranged side by side behind the storage tray 29 of this stepped upper face portion 4.

Moreover, a steering wheel 34 is provided via a steering column 33 on the right of the shift lever 32 in the stepped upper face portion 4.

A drink holder 38 is provided on the upper side of the intermediate portion in a direction extending from the right side to the left side in the front portion 5 of the instrument panel 1 and a storage section 39 which extends to the floor is provided on the lower side of the intermediate portion in the direction extending from the right side to the left side.

Additionally, a glove box 50 is provided on the side opposite to the steering wheel 34 in the direction extending from the right side to the left side in the front portion 5 of the instrument panel 1.

A steering hanger beam 51 (which will be described later with reference to FIG. 3) is provided on the front side of an intermediate portion in the vertical direction of the instrument panel 1 so as to extend in a direction extending from the right side to the left side in the instrument panel 1, and right and left ends of the steering hanger beam 51 are fixed to a vehicle body so as to connect right and left front pillars (not shown) whereby the instrument panel 1 is attached to a vehicle body.

The steering hanger beam 51 supports a steering shaft (not shown) connected with the steering wheel 34.

The above-described AV unit 21 is fixed to the steering hanger beam 51 in the intermediate portion in a direction extending from the right side to the left side in the steering hanger beam 51.

Figure 2:
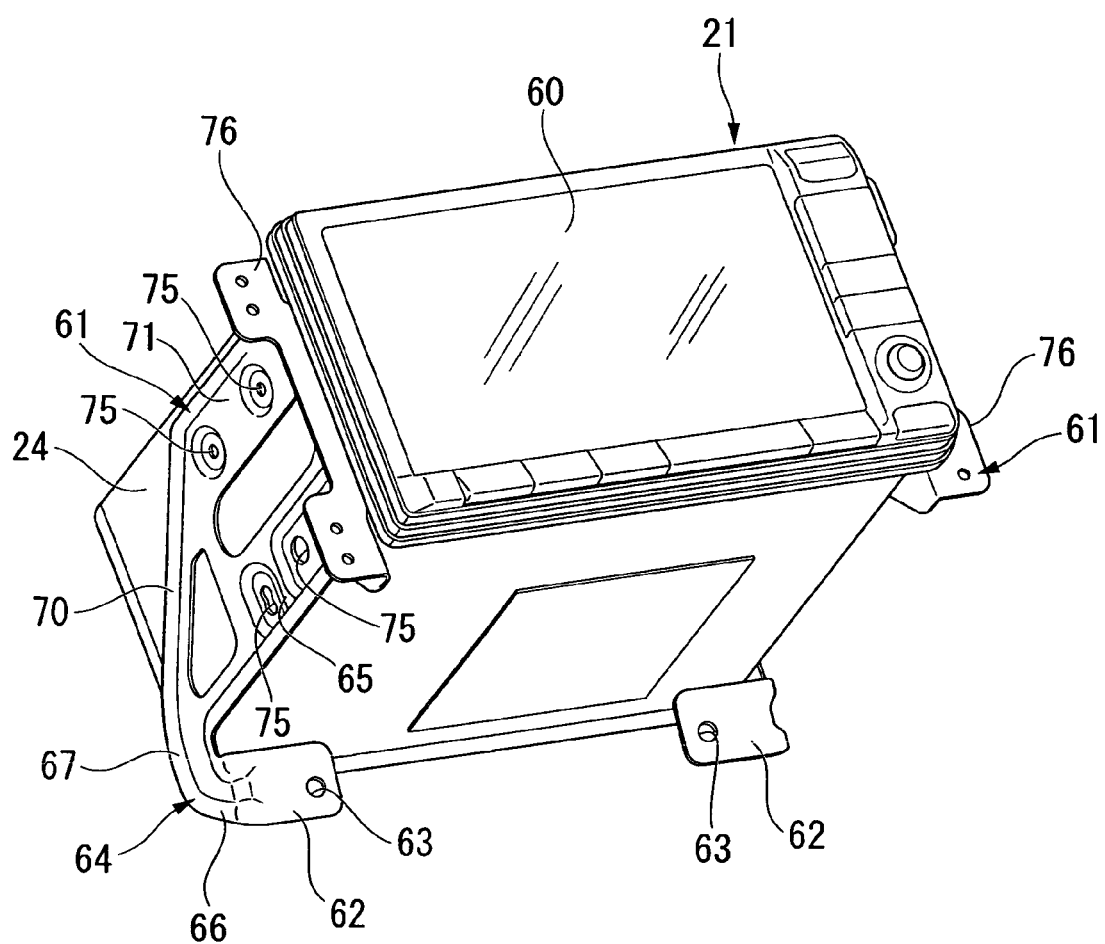
FIG. 2 is a perspective view showing an AV unit in a state where a bracket in the embodiment of the invention is fixed.

As shown in FIG. 2, the AV unit 21 is configured such that a pair of brackets 61 which is bilaterally and symmetrically formed can be attached, and is supported by the steering hanger beam 51 via the brackets 61.

Each bracket 61 is formed of a substantially flat plate-like metal material, and includes a base-side arm portion 64 (base) which is fixed to the steering hanger beam 51, and a unit supporting portion 65 (support section) which is formed continuously with the end of the arm portion 64, extends substantially toward the rear of the vehicle, more specifically, extends in a state where it inclines upward toward the rear from the end of the arm portion 64, and supports the AV unit 21.

The arm portion 64 includes an extending portion 66 which extends substantially horizontally toward the front of the vehicle from the base side, and a curved portion 67 which is curved toward the upper portion of the vehicle in the vicinity of a lower angle portion of a front portion in a vehicle longitudinal direction of a side wall 24 of the AV unit 21.

The base of the extending portion 66 is formed with a bent portion 62 which is bent toward the inside in a right-and-left width direction of the AV unit 21, and the bent portion 62 is formed with an attachment hole 63.

The bent portion 62 is fixed to an attaching extending portion 68 (refer to FIG. 3) of the steering hanger beam 51 by screws or the like via the attachment hole 63.

The unit supporting portion 65 includes a widened portion 70 which is formed continuously with the end of the above-described arm portion 64, and is formed in a widened manner so as to gradually approach an upper edge of the side wall 24 of the AV unit 21 toward the rear in the vehicle longitudinal direction.

A lower edge of the widened portion 70 is formed along a lower edge of the side wall 24 of the AV unit 21 in the state where the bracket 61 is attached to the AV unit 21.

Furthermore, the unit supporting portion 65 includes a main plate portion 71 which is formed continuously with a rear portion of the widened portion 70 in the vehicle longitudinal direction.

The main plate portion 71 has an upper edge and a lower edge formed in parallel with a predetermined height slightly smaller than the height of the AV unit 21, and has an end arranged slightly closer to the back face of the AV unit 21 than the liquid crystal display 60 of the AV unit 21 in a state of being attached to the AV unit 21.

In addition, lightening portions are formed in proper positions in the above-described widened portion 70 and main plate portion 71 whereby weight saving is achieved.

Screw attachment holes 75 are formed along the upper edge and lower edge, respectively, of the main plate portion 71.

On the other hand, screw holes (not shown) are formed in the side wall 24 of the AV unit 21 in the positions corresponding to the screw attachment holes 75 of the main plate portion 71, and the brackets 61 are fixed to the right and left side walls 24 of the AV unit 21 using screws (not shown) or the like via the screw attachment holes 75 and screw holes.

Additionally, the main plate portion 71 includes a flange portion 76 which is curved on the right and left outside a liquid crystal display 60 of the AV unit 21.

In addition, the invention is not limited to a method of attaching the bracket 61 to the AV unit 21 using screws or the like, but the bracket may be attached to the AV unit, for example, using attachment pins or the like.

Figure 4:
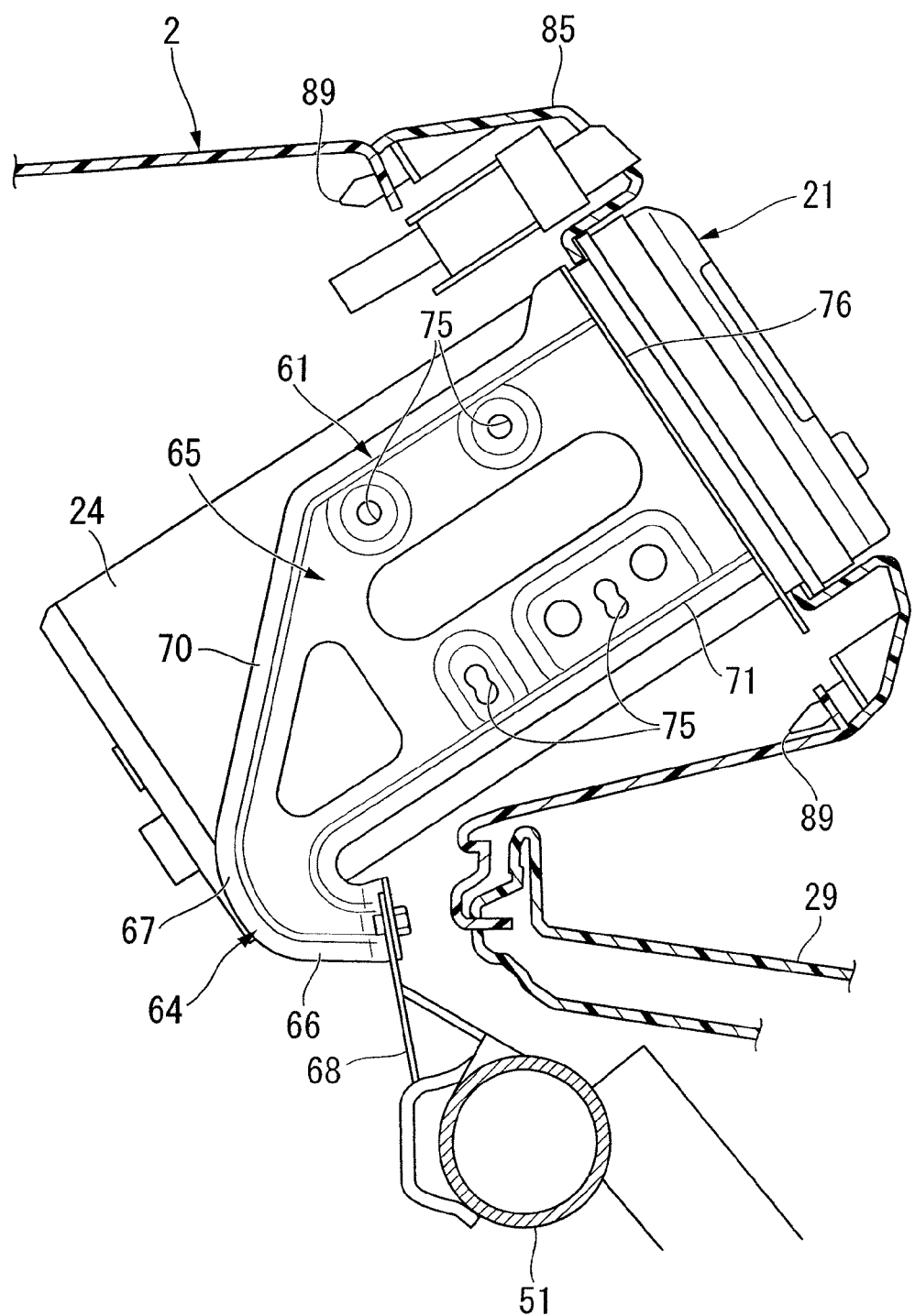
FIG. 4 is a cross-sectional view showing a part of the AV unit when the AV unit in the state of being attached to the instrument panel in the embodiment of the invention is seen from the side.

As shown in FIG. 4, the unit supporting portion 65 of the bracket 61 is arranged above the steering hanger beam 51, and is formed so as to be sufficiently long as compared with the extending portion 66.

The main plate portion 71 is inclined with respect to a horizontal extending portion 66 such that a front portion thereof is low and a rear portion thereof becomes higher, and the AV unit 21 is attached along the main plate portion 71 whereby the liquid crystal display 60 of the AV unit 21 is attached to the steering hanger beam 51 in a state where it faces the upper rear of a vehicle, and its relative position is fixed.

Figure 5:
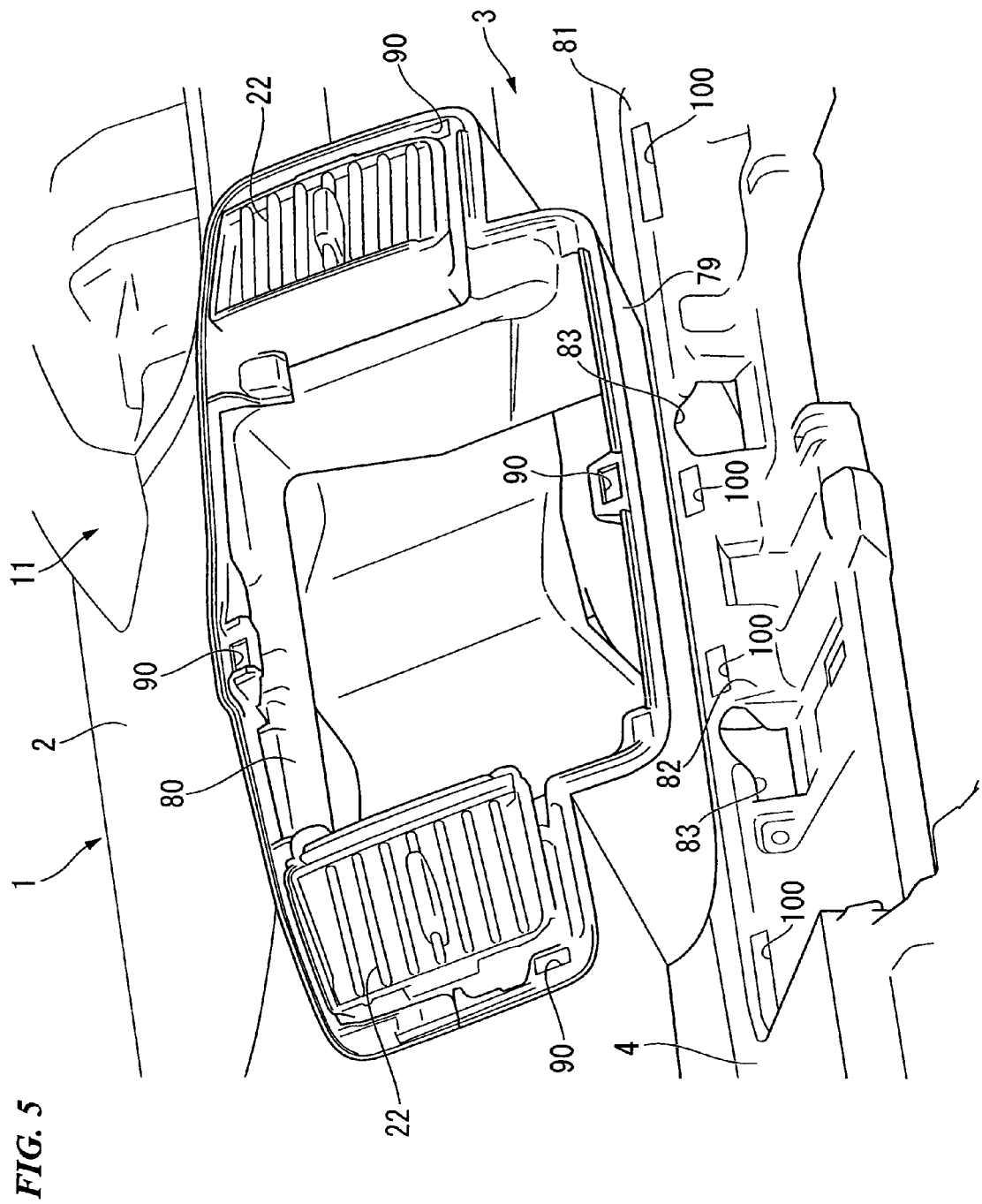
FIG. 5 is a perspective view showing the periphery of a unit attachment hole in the embodiment of the invention.

As shown in FIG. 5, a unit attachment hole 80 (second opening section) for arranging the AV unit 21 is formed in an intermediate portion in the direction extending from the right side to the left side of the vertical face portion 3 of the instrument panel 1.

A lower wall portion 79 of the unit attachment hole 80 is formed so as to protrude obliquely upward and rearward from the vehicle front of the stepped upper face portion 4 so that the liquid crystal display 60 of the AV unit 21 and the peripheral edge of the unit attachment hole 80 are arranged on almost the same plane in the state where the AV unit 21 is attached.

A tray attachment hole 81 (opening section, first opening section) for attaching the storage tray 29 is formed below a lower wall portion 79 of the unit attachment hole 80, i.e., below the unit supporting portion 65 of the bracket 61 (refer to FIG. 4).

A pair of service holes 83 is formed at positions symmetrical with respect to the middle in a direction extending from the right side to the left side in a vertical wall 82 of the storage tray attachment hole 81 on the side of the vehicle front.

The service holes 83 are formed in order to perform the operation of fastening the attaching extending portion 68 (refer to FIG. 3) of the steering hanger beam 51, and the bent portion 62 (refer to FIG. 2) of the bracket 61.

Figure 3:
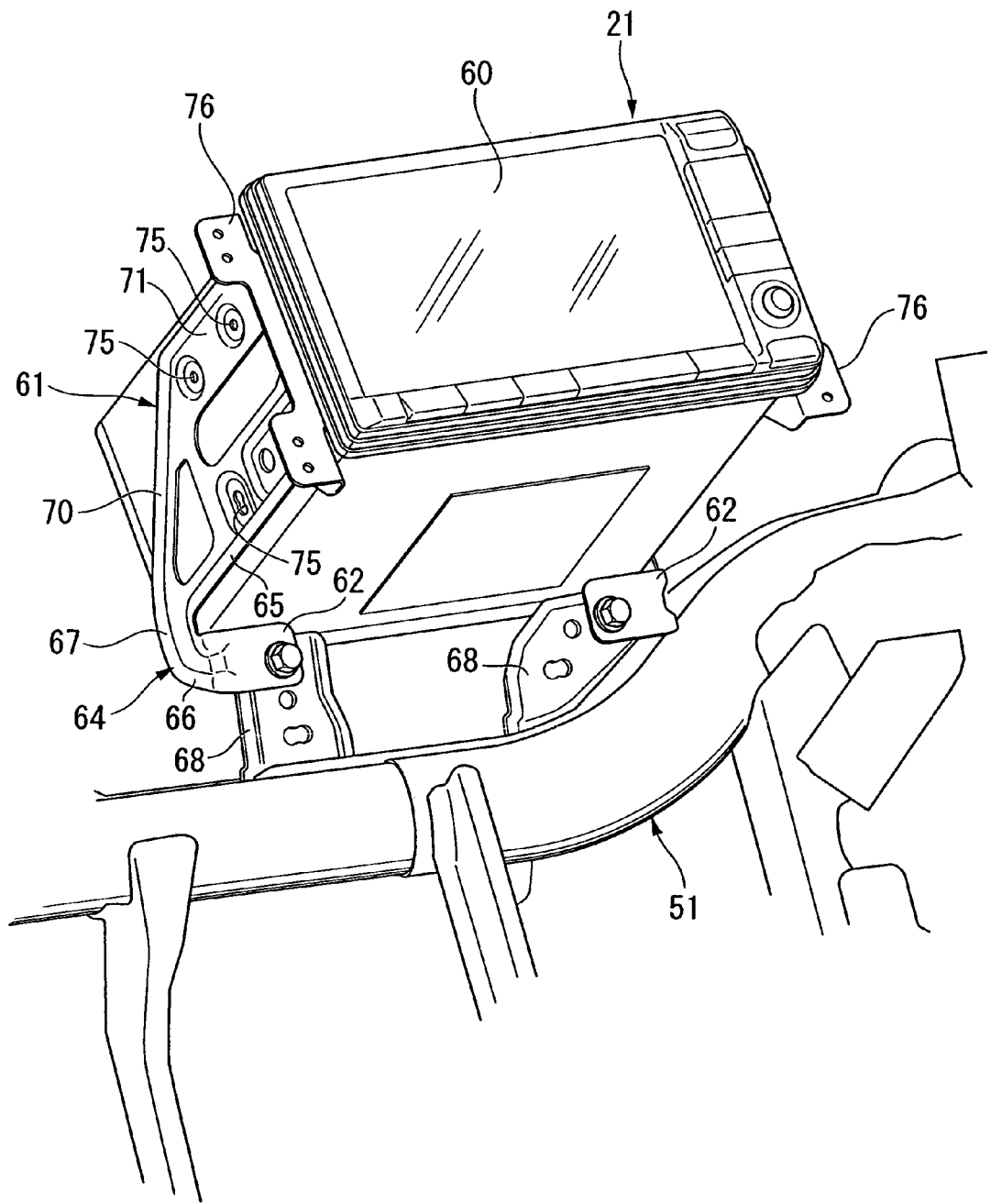
FIG. 3 is a perspective view illustrating the connection between the AV unit and a steering hanger beam in the embodiment of the invention.

As shown in FIG. 3, the attaching extending portion 68 which extends upward in a state where it is slightly inclined to the vehicle front is fixed to the steering hanger beam 51 by welding or the like, and the attaching extending portion 68 is exposed to the inside of the vehicle via the service holes 83 (not shown).

Figure 6:
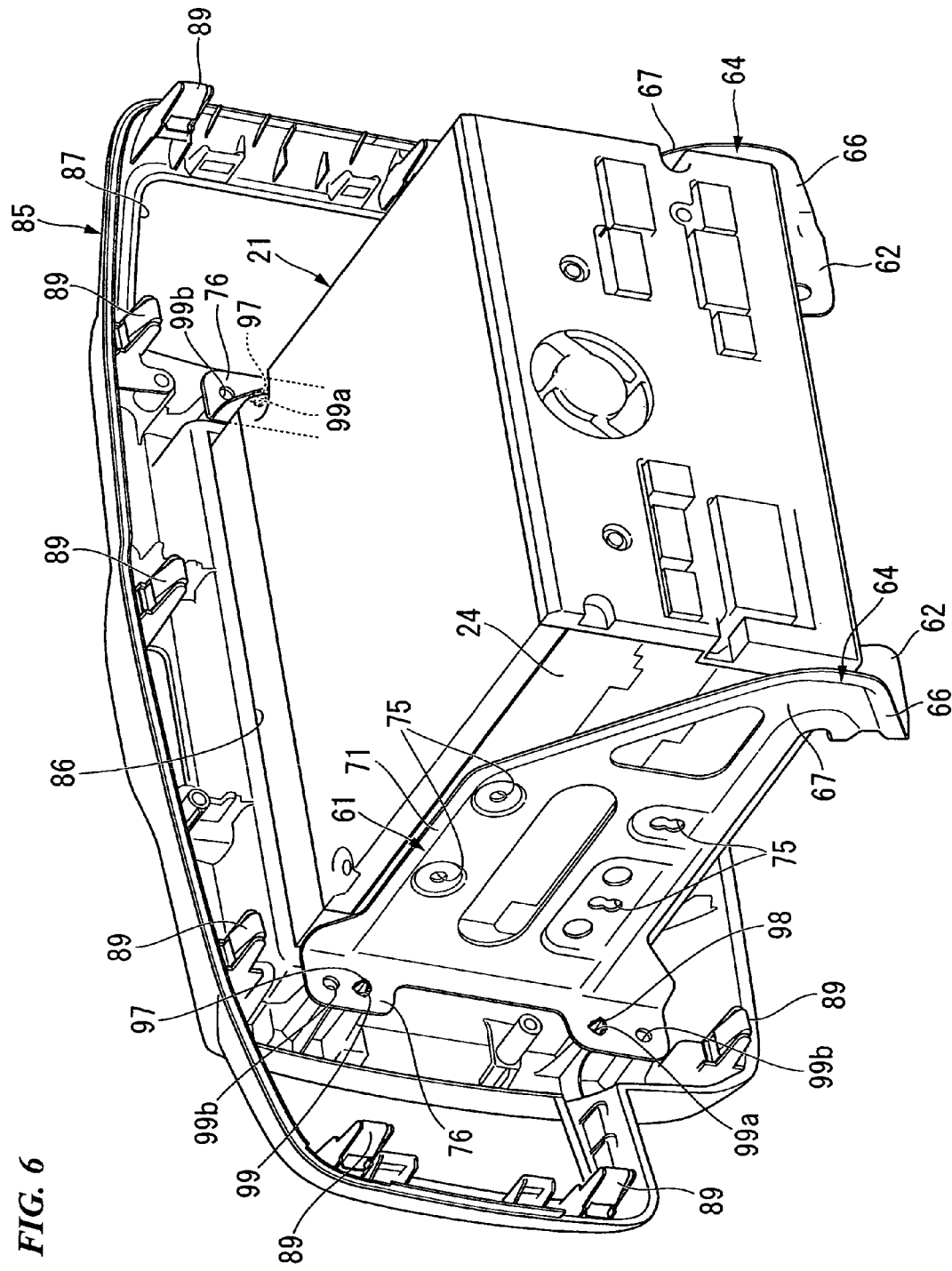
FIG. 6 is a perspective view showing a frame when the frame in the embodiment of the invention is seen from the rear side.

As shown in FIG. 6, a frame or exterior aesthetic cover 85 is attached to the peripheral edge of the AV unit 21 on the side of the liquid crystal display 60 and the peripheral edge of the unit attachment hole 80, which are exposed to the inside of the vehicle, so as to cover these edges integrally, and is integrated with the brackets 61.

The frame 85 is formed so as to integrally cover the peripheral edge of the air-conditioner blow-off ports 22 arranged on both sides of the unit attachment hole 80 in addition to the peripheral edge of the liquid crystal display 60 of the AV unit 21 and the peripheral edge of the unit attachment hole 80. A central hole 86 formed substantially in the shape of a rectangle corresponding to the peripheral edge of the liquid crystal display of the AV unit 21 is arranged in the central position in a direction extending from the right side to the left side in the frame. A left hole 87 and a right hole 88, corresponding to the air-conditioner blow-off ports 22, which are formed substantially in the shape of a vertically long rectangle, are respectively formed on both sides of the central hole 86.

On the frame 85, a tapered upper pin 97 and a tapered lower pin 98 are respectively formed protrudingly on the rear sides of the left frame 95 and right frame 96 which constitute the central hole 86.

Figure 7:
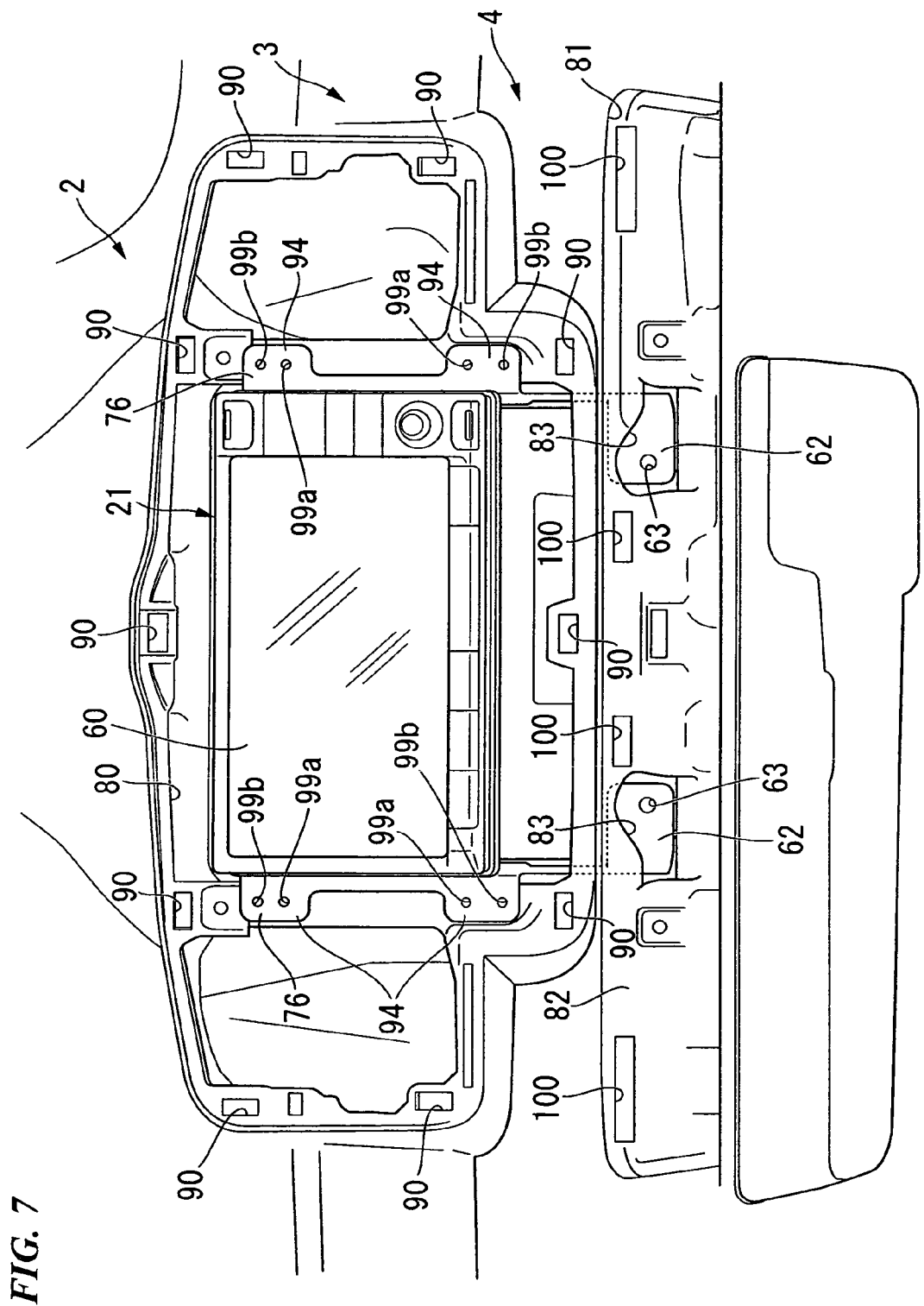
FIG. 7 is a front view showing the AV unit that is attached to the unit attachment hole in the embodiment of the invention.

Additionally, as shown in FIG. 7, widened portions 94 formed so as to be slightly wider than the intermediate portion are formed in the upper and lower portions of the flange portion 76 of the bracket 61 which face the upper pin 97 and the lower pin 98, and holes 99a are formed in the widened portions 94.

By inserting the upper pin 97 and the lower pin 98 into the holes 99a arranged to face these pins, and pressing the frame 85 against the AV unit 21, the upper pin 97 and the lower pin 98 are pushed into the holes 99a, the inner peripheral surface of each hole 99a is pressed against the outer peripheral surface of the upper pin 97, or the outer peripheral surface of the lower pin 98, and the relative position between the peripheral edge of the AV unit 21 on the side of the liquid crystal display 60 and the frame 85 is determined.

In this state, the frame 85 is fixed to the bracket 61 by screws (not shown) from the vehicle front, in screw holes 99b formed in the vicinity of the upper pin 97 and the lower pin 98 of the flange portion 76.

Additionally, a plurality of clips 89 which protrudes toward the peripheral edge of the unit attachment hole 80 are provided at predetermined intervals in outer peripheral positions of the frame 85.

Additionally, as shown in FIG. 7, engagement holes 90 are formed in positions which face the clips 89 of the frame 85 at the peripheral edge of the unit attachment hole 80.

By inserting the clips 89 into the engagement holes 90 and pressing the frame 85 against the AV unit 21, the clips 89 are engaged with the engagement holes 90 of the peripheral edge of the unit attachment hole 80, the displacement of the frame 85 in the direction of detachment under a predetermined pulling force is regulated, and the frame 85 is attached to the instrument panel 1.

That is, since the frame 85 is fixed to the instrument panel 1 via the clips 89 as described above, the peripheral edge of the AV unit 21 on the side of the liquid crystal display 60 is fixed to the peripheral edge of the unit attachment hole 80 of the instrument panel 1 via the flange portion 76 of the bracket 61 and the frame 85.

Moreover, as shown in FIG. 7, when the AV unit 21 in the state where the above-described bracket 61 is fixed is inserted into the unit attachment hole 80 from the back face of the AV unit 21, and the clips 89 (refer to FIG. 6) of the frame 85 whose illustration is omitted in FIG. 7 are inserted into the engagement holes 90, the bent portion 62 of the bracket 61 is arranged so as to overlap the vehicle rear of the attaching extending portion 68 of the steering hanger beam 51, and is exposed to the inside of the vehicle via the service holes 83 of the tray attachment hole 81.

Next, the attachment sequence of the AV unit 21 in the instrument panel 1 having the above-described configuration will be described.

First, as shown in FIG. 2, the AV unit 21 and a pair of brackets 61 are integrated by fastening the brackets 61 to the right and left side walls 24, respectively, of the AV unit 21 by screws or the like. Next, as shown in FIG. 4, the frame 85 is fastened, fixed, and attached to the flange portion 76 of each bracket 61 by screws or the like (not shown) from the vehicle front.

A unit obtained by integrating the AV unit 21, the brackets 61, and the frame 85 is inserted into the unit attachment hole 80 shown in FIG. 5 from the back face of the AV unit 21, whereby the clips 89 of the frame 85 are aligned with the engagement holes 90 of the unit attached hole. Also, the unit is inserted into the position where the upper pin 97 is aligned with the hole 99, and the lower pin 98 is aligned with the hole 99, whereby a gap between the frame 85 and the peripheral edge of the air-conditioner blow-off ports 22 is not formed.

Then, the AV unit 21 whose weight is supported by the clips of the frame 85, as shown in FIG. 7, is exposed in a state where the attachment hole 63 provided in the bent portion 62 of the bracket 61 substantially coincides with an attachment hole formed in the attaching extending portion 68 of the steering hanger beam 51 through the service holes 83. Thus, the bent portion 62 is fixed to the attaching extending portion 68 of the steering hanger beam 51 by screws or the like. The AV unit 21 is thereby fixed to the steering hanger beam 51 via the brackets 61.

In addition, it is preferable that the connection of wiring lines of the AV unit 21 be finished before the AV unit 21 is inserted into the attachment hole 80.

On the other hand, the storage tray 29 is pushed into the tray attachment hole 81 formed in the stepped upper face portion 4.

A pawl (not shown) of the storage tray 29 is thereby locked into the hole 100 formed in the upper portion of an opening of the vertical wall 82 of the tray attachment hole 81, and the tray attachment hole 81 is blocked by the storage tray 29.

Therefore, according to the above-described instrument panel 1, since the bracket 61 includes the extending portion 66 which extends to the front of the vehicle, the AV unit 21 thereby can be arranged at the front of the vehicle with respect to the steering hanger beam 51 compared with a conventional one. Therefore, the degree of layout freedom of parts in front of and above the steering hanger beam 51 can be improved while the AV unit 21 is firmly supported.

Moreover, the space below the unit supporting portion 65 can be effectively used as a storage space by providing the storage tray 29 below the unit supporting portion 65 of the bracket 61.

Additionally, when the AV unit 21 is attached to the steering hanger beam 51 via the brackets 61, the bent portion 62 formed at the base of each bracket 61 can be accessed via the tray attachment hole 81 to which the storage tray 29 is attached. Therefore, attachment workability of the AV unit 21 can be improved.

Also, the flange portion 76 of the unit supporting portion 65 is supported by the instrument panel 1 of the peripheral edge of the unit attachment hole 80 via the frame 85 and the load of the AV unit 21 is decentralized. Thus, even in a case where the distance from the steering hanger beam 51 to the AV unit 21 increases, vibration of the AV unit 21 can be prevented.

Additionally, since temporary holding becomes possible before the operation of the brackets 61 fastening to the steering hanger beam 51 by adopting a configuration in which the frame 85 and the brackets 61, and the AV unit 21 are integrated, fastening operation becomes easier.

Moreover, the tray attachment hole 81 is blocked after the brackets 61 are attached to and integrated with the AV unit 21, this integrated unit is inserted through the unit attachment hole 80, and the bent portion 62 at the base of each bracket 61 is fixed to the attaching extending portion 68 of the steering hanger beam 51 through the tray attachment hole 81 and the service holes 83. Therefore, the AV unit 21 can be firmly fixed to the steering hanger beam 51, and attachment operation of the AV unit 21 can be easily performed.

Figure 8:
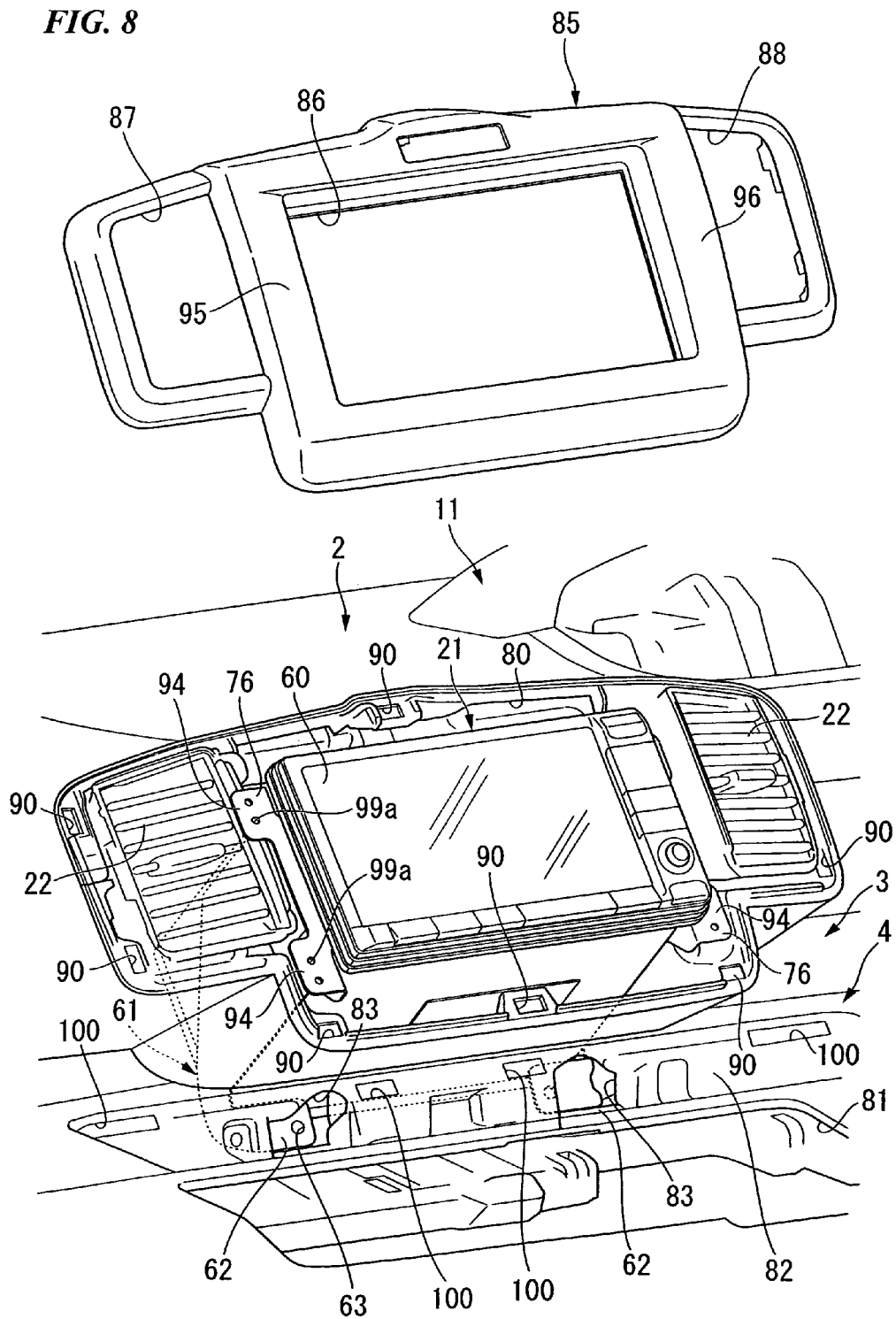
FIG. 8 is a perspective view showing a part of the instrument panel before a frame in another embodiment of the invention is attached.

In addition, the invention is not limited to the above-described embodiment. As other embodiments, for example, as shown in FIG. 8, the load of the AV unit 21 may be supported in a decentralized manner by attaching the frame 85 after the brackets 61 and the AV unit 21 are integrated and attached to the steering hanger beam 51.

In this case, the frame 85 is fixed to the flange portion 76 of each bracket 61 by clips or the like from the rear of the vehicle.

Additionally, although an example where the AV unit 21 is attached to the instrument panel 1 has been described in the above-described embodiment, vehicle-mounted devices other than AV unit 21 may be attached.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. An instrument panel for a vehicle which has a vehicle-mounted device provided therewith, comprising:
   a steering device;
   a steering hanger beam supporting the steering device;
   a bracket including a base fixed to the steering hanger beam, an extending portion that extends to a front of the vehicle from the base, a support section that is curved toward an upper portion of the vehicle at a front portion of the extending portion and extends substantially in a rearward direction of the vehicle; and
   a vehicle-mounted device attached to the support section and fixed to the steering hanger beam via the bracket.

2. The instrument panel according to claim 1, further comprising
   a storage section provided below the support section.

3. The instrument panel according to claim 2, further comprising
   an instrument panel body having an opening section, wherein
   the instrument panel body is fixed to the steering hanger beam below the support section such that the opening section provides selective access to the steering hanger beam, and the storage section is removably provided in the opening section of the instrument panel body.

4. The instrument panel according to claim 1, further comprising:
an instrument panel body; and
a frame, wherein
the support section is supported by the instrument panel body via the frame, and
the frame includes an exterior cover surrounding a periphery of the vehicle-mounted device.

5. A method for attaching vehicle-mounted device to an instrument panel for a vehicle, the method comprising:
providing the instrument panel including:
a steering device;
a steering hanger beam supporting the steering device;
a bracket including a base fixed to the steering hanger beam, an extending portion that extends to a front of the vehicle from the base, a support section that is curved toward an upper portion of the vehicle at a front of the extending portion in the vehicle, extends substantially in a rearward direction of the vehicle, and supports the vehicle-mounted device;
an instrument panel body including a first opening section; and a second opening section;
attaching the bracket to the vehicle-mounted device so that the bracket is integrated with the vehicle-mounted device;
inserting a unit in which the bracket has been integrated with the vehicle-mounted device to the second opening section;
fixing the base of the bracket to the steering hanger beam through the first opening section formed on the instrument panel body; and
blocking the first opening section of the instrument panel body.

6. The method according to claim 5, further comprising:
fixing the support section by a frame; and
covering the support section and the second opening section with the frame, and the frame includes an exterior cover surrounding a periphery of the vehicle-mounted device.

7. The method according to claim 5, wherein a storage section is provided below the support section, and the storage section is removably provided in the first opening section of the instrument panel body for selectively blocking the first opening section.

8. The instrument panel according to claim 1, wherein a main part of the support section is substantially planar and attaches to a vertically-extending side wall of the vehicle-mounted device.

9. The instrument panel according to claim 1, wherein the base of the bracket extends laterally of the vehicle directly beneath the vehicle-mounted device.

10. The instrument panel according to claim 4, wherein the support section includes a flange portion extending away from the vehicle-mounted device and which is connected to the frame.

11. The instrument panel according to claim 1, wherein the instrument panel body has first and second opening sections, and when a unit including the bracket attached to the vehicle-mounted device is inserted in the second opening section the first opening section provides access for fixing the bracket base to the steering hanger beam.

12. The instrument panel according to claim 11, further comprising a storage section removably provided in the first opening section of the instrument panel body for selectively blocking the first opening section.

* * * * *